United States Patent
Falco et al.

(10) Patent No.: US 6,545,996 B1
(45) Date of Patent: Apr. 8, 2003

(54) MANAGEMENT OF WIRELESS CONTROL CHANNEL

(75) Inventors: Steven Anthony Falco, Morris Plains, NJ (US); Stephen Gregory Strickland, Holmdel, NJ (US); Ming-Hsu Tu, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/209,509

(22) Filed: Dec. 10, 1998

(51) Int. Cl.[7] .............................................. H04Q 1/00
(52) U.S. Cl. ...................................... 370/347; 455/515
(58) Field of Search ................................ 370/345, 347; 340/7.43; 455/464, 515, 512, 434, 458, 466

(56) References Cited

U.S. PATENT DOCUMENTS

| | | | | |
|---|---|---|---|---|
| 4,319,353 A | * | 3/1982 | Alvarez | 370/345 |
| 4,330,857 A | * | 5/1982 | Alvarez | 370/345 |
| 5,404,355 A | | 4/1995 | Raith | 370/95.1 |
| 5,537,685 A | * | 7/1996 | Matsuno | 455/512 |
| 5,768,276 A | | 6/1998 | Diachina | 370/432 |
| 5,896,376 A | * | 4/1999 | Alperovich | 370/347 |
| 6,005,854 A | * | 12/1999 | Xu et al. | 370/335 |
| 6,031,832 A | * | 2/2000 | Turina | 370/348 |
| 6,111,863 A | * | 8/2000 | Rostoker | 370/347 |

OTHER PUBLICATIONS

Richard Sunlin A Hybrid Ditrtibuted Slot Assignment TDMA Channel Access Protocol. IEEE 46.3.1–5, 1990.*

Xuenfeng Dong, An Efficient Prioroty–Based Dynamic Channel Allocation Strategy for Mobile Cellular Networks, IEEE 7d. 1–8, 1997.*

* cited by examiner

*Primary Examiner*—Brian Zimmerman
(74) *Attorney, Agent, or Firm*—Ryan, Mason & Lewis, LLP

(57) ABSTRACT

A method that selects one of a plurality of priority schemes for scheduling messages for one of cyclically repeating sets of time slots of a control channel based on at least one of a plurality of characteristics of the state of the control channel. The state of the control channel is all information regarding what has arrived, what is queued, and what has been transmitted. This includes the status of the queues, the messages awaiting transmission, along with their type and the time they have been waiting, the sequence of past transmissions, as well as other information.

20 Claims, 12 Drawing Sheets

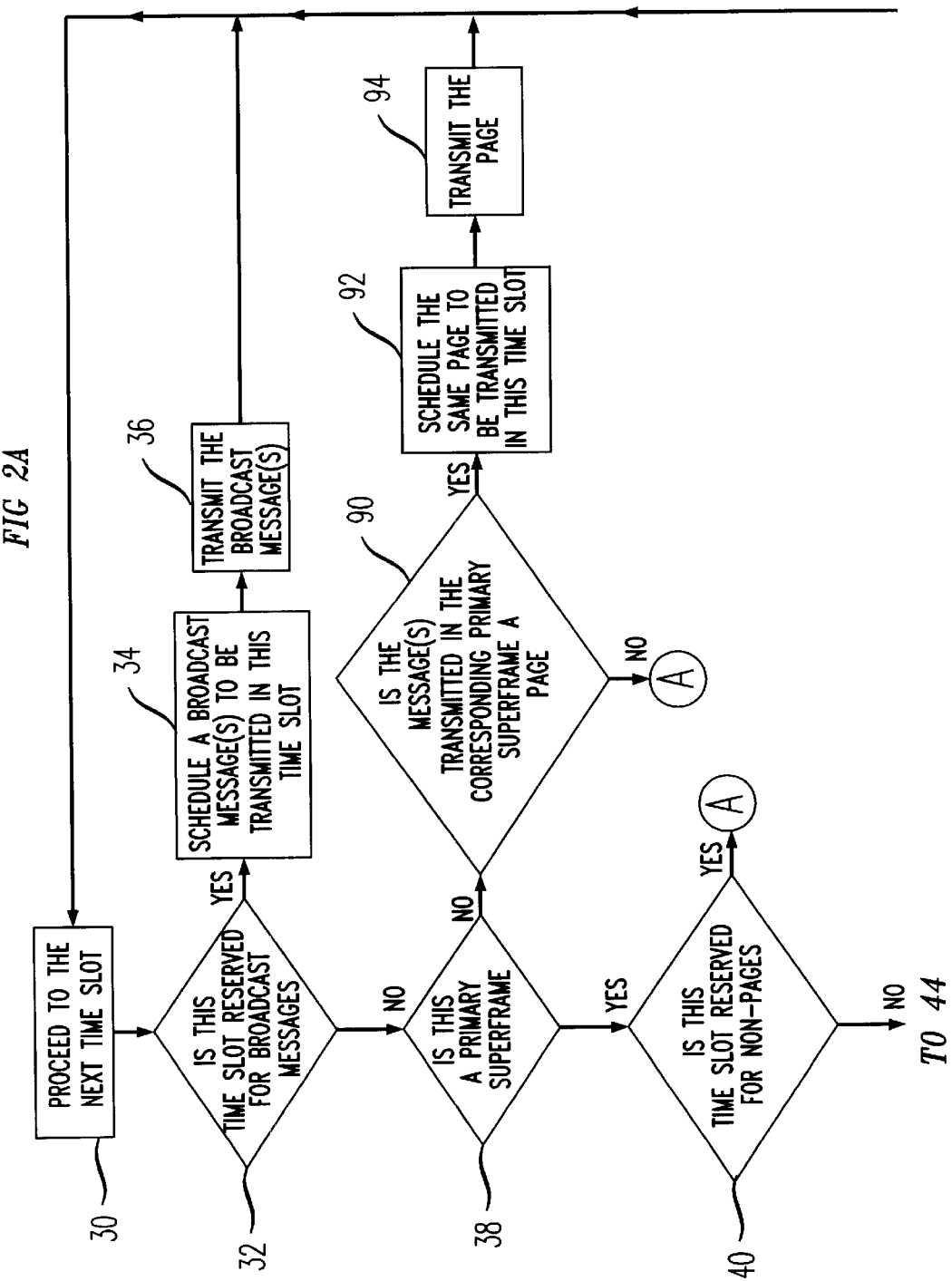

MANAGEMENT OF WIRELESS CONTROL CHANNEL

FIELD OF THE INVENTION

This invention is related to a control channel of a wireless telecommunications system, and more particularly to the scheduling of messages on the control channel.

BACKGROUND OF THE INVENTION

The radio spectrum assigned to a wireless telecommunications system is divided into radio channels. The radio channels are typically grouped into multiple traffic and control channels. The traffic channels are used for transmission of voice and user data information between a base station and mobile stations. The control channels are used for transmission of broadcast messages that convey system information, control messages, pages, and short user data messages between the base station and the mobile stations. Pages are messages that notify a mobile station that a base station needs to send further instructions to the mobile station. Pages include voice pages, notification of short messages, and message waiting messages.

The control channel's pages wake up a mobile station when the mobile station is in sleep mode. Typically, to conserve power, a mobile station operates in a sleep mode, where most of the mobile station's systems are in either off or operating in a power conservation mode. The mobile station wakes up, i.e. exits from sleep mode, for a predetermined short period of time to monitor the control channel to determine whether it needs to remain awake or whether it can return to the sleep mode. If a mobile station receives a page from the base station during the predetermined time period, or if there is local action that requires the mobile station to wake up, the mobile station turns on some or all of the internal systems that were off during sleep mode.

The control channel also includes non-pages, such as acknowledgements including mobile station registration acknowledgements, and control messages that are used to set up a call including channel assignments. Additionally, depending on the system the control channel may also include other messages. Typically, the organization of the control channel and the information transmitted on the control channel is dependent on the type of air interface used.

Referring to FIG. 1A, for example, in a typical system using the North American Time Division Multiple Access (TDMA) system the radio spectrum is divided into 30 kHz radio channels 5. Each radio channel 5 is divided into time slots having a duration of 6.67 milliseconds (ms). Three time slots comprise a TDMA Block and two consecutive TDMA Blocks or six time slots comprise a frame. As shown in FIG. 1A, every third time slot is used to create communication channel 10. A communication channel can be either a control channel or a traffic channel. All time slots 1 and 4 are associated with one communication channel. All time slots 2 and 5 are associated with another communication channel, and all time slots 3 and 6 are associated with a third communication channel. When the control channel is used for sending information from the base station to the mobile station it is a downlink control channel, and when the control channel is used for sending information from the mobile station to the base station it is an uplink control channel. In a downlink control channel, 32 time slots comprise superframe 11 having a duration of 0.64 seconds, and as shown in FIG. 1B, two such superframes 11, 14 comprise hyperframe 12 having a duration of 1.28 seconds. The first superframe in a hyperframe is referred to as the primary superframe (primary superframe 11) and the second superframe is referred to as the secondary superframe (secondary superframe 14). Each time slot has a time slot number that identifies the time slot's position in the superframe. Each hyperframe has a hyperframe number that identifies the position of the hyperframe in a cyclic repetition of hyperframes, which is typically 12 hyperframes.

In downlink control channel 10, several of the time slots in each superframe are reserved for broadcasting. Broadcasting is the transmittal of generic system related information. The remaining time slots are used for all of the other messages carried by the control channel. As discussed above, in order to conserve power a mobile station only monitors the control channel during one assigned time slot and remains in sleep mode during the rest of the time slots. The mobile station is assigned to a particular time slot based on the mobile station's mobile identification number (MIN). In North American TDMA the MIN is the mobile station's area code and phone number. A hashing algorithm is used to determine which time slot is assigned to a particular MIN. A hashing algorithm is a function or table that pseudo-randomly assigns an output, such as a particular time slot, based on an input, such as the MIN.

Monitoring the control channel during one assigned time slot and remaining in sleep mode during the rest of the time slots results in the mobile station waking up for only one time slot in every superframe to check for pages such as voice pages or R-DATA SPACH notifications. A voice page is a brief page that informs the mobile station that there is a call to the mobile station, and an R-DATA SPACH notification is a brief message that informs the mobile station that there is a short message or SMS for the mobile station. If a mobile station receives a page, such as a voice page or a R-DATA SPACH notification, then the mobile station starts monitoring all of the time slots of the control channel to find further information, which can be in any time slot except the ones reserved for broadcast messages. In the case of receiving a voice page, the mobile station is waiting to receive a channel assignment in order to know what traffic channel to switch to to begin the voice call. In the case of receiving an R-DATA SPACH notification, the mobile station is waiting to receive a short message. If the mobile does not receive the further information within a certain period of time, for example 10 to 15 seconds, the mobile station goes back into sleep mode.

Pages are transmitted in the corresponding time slots of both superframes of a particular hyperframe. Referring to FIG. 1B, pages are transmitted once in a time slot of the first, or primary superframe 11, and a second time in the corresponding time slot of the second, or secondary superframe 14 of the same hyperframe 12. Non-pages are transmitted only once, and each message may require one or several time slots of the superframe. For example, if a channel assignment is transmitted in time slots 7 and 9 of primary superframe 11 of hyperframe 12, a different non-page can be transmitted in time slots 7 and 9 of secondary superframe 14. Typically, the priorities of pages are higher than that of the other messages, with voice pages having the highest priority. The priority of messages is typically fixed when the wireless communication system is designed and is based on the messages' characteristics, such as the messages' revenue generation potential, whether the message is assigned to a particular time slot (such as a voice page for a particular mobile station), and the timeout sensitivity of the message. A message's timeout sensitivity is determined by how quickly the message is dropped because the message had to wait to be transmitted for a longer time than allowed by the system for this type of message. A timed out message is one that had to wait longer than the time allowed by the system.

A mobile station registers with the wireless communication system using the uplink control channel. The base station that received the mobile station's registration message over the uplink control channel is identified as the base station having the mobile station within its cell. The wireless system may initially attempt to send pages to the mobile station using only the base station where the mobile last registered. If the mobile station is still in the cell where it last registered, the mobile station will receive pages. However, in most cases the mobile station is no longer in the cell where it last registered and the system needs to send the pages to other cells to try to contact the mobile station. Depending on the system, this can include only cells in the vicinity of where the mobile station last registered or a larger area, such as the state where the mobile station last registered, or the country where the mobile station last registered. As can be seen, this results in a very large number of voice pages, most of which have no possibility of reaching their intended mobile stations. However, since these voice pages have the highest priority they still take priority over other messages notwithstanding that most of the voice pages will not be received by the intended mobile station.

A problem with this system is that when many mobile stations are being voice paged, it is possible for the voice pages to fill all of the time slots in a particular cell and prevent the other messages from getting through. Therefore, calls placed to any mobile station located in a cell that is flooded with voice pages are never set up because even though the mobile station receives the voice page, the mobile station cannot receive a channel assignment that directs it to a particular traffic channel since all of the time slots are occupied by the higher priority voice pages. Furthermore, no short messages sent at this time are able to reach mobile stations in this cell because all of the time slots are occupied by voice pages. Table 1 is a simulation showing the blocked messages and timed out messages for a control channel based on voice page arrival rate given as a percentage of the control channel's voice page capacity in a system where each control channel has 300 buffers. The buffers are used for storing messages that cannot be transmitted immediately when they are received. This means that any message that arrives in excess of the 300 that can be stored in the buffers is discarded, i.e. it is a blocked message. The number of blocked calls is zero until the number of buffers used reaches 300. The number of timed out messages also increases as the percentage of the control channel's voice page capacity is filled.

TABLE 1

Conventional Priority Method

| Voice page load | 10% | 15% | 20% | 25% | 30% | 35% |
|---|---|---|---|---|---|---|
| Voice pages/hour | 16,031 | 24,047 | 32,063 | 40,078 | 48,094 | 56,109 |
| Queue-MAX | 18 | 23 | 31 | 42 | 58 | 190 |
| Blocked Messages/hour | 0 | 0 | 0 | 0 | 0 | 0 |
| Timed Out - voice pages/hour | 0 | 0 | 0 | 0 | 0 | 0 |
| Timed Out - channel assignments/hour | 0 | 0 | 0 | 0 | 0 | 0 |
| Timed Out - message waiting/hour | 0 | 0 | 0 | 0 | 0 | 0 |
| Timed Out - R-DATA SPACH notifications/hr | 40 | 157 | 413 | 855 | 1441 | 2384 |
| Timed Out - registration acknowledgements/hr | 0 | 0 | 0 | 0 | 0 | 0 |
| Total (Timed Out + Blocked messages)/min | 1 | 3 | 7 | 14 | 24 | 40 |

| Voice page load | 40% | 45% | 50% | 55% | 60% |
|---|---|---|---|---|---|
| Voice pages/hour | 64,125 | 72,141 | 80,156 | 88,172 | 96,188 |
| Queue-MAX | 300 | 300 | 300 | 300 | 300 |
| Blocked Messages/hour | 2237 | 9017 | 17130 | 24113 | 32325 |
| Timed Out - voice pages/hour | 0 | 0 | 0 | 0 | 1 |
| Timed Out - channel assignments/hour | 0 | 0 | 0 | 0 | 0 |
| Timed Out - message waiting/hour | 35 | 25 | 22 | 5 | 16 |
| Timed Out - R-DATA SPACH notifications/hr | 3231 | 3551 | 3527 | 3867 | 3895 |
| Timed Out - registration acknowledgements/hr | 0 | 5 | 15 | 38 | 40 |
| Total (Timed Out + Blocked messages)/min | 92 | 210 | 345 | 467 | 605 |

Giving other pages higher priority than voice pages poses the same problem as encountered with giving voice pages highest priority. If R-DATA SPACH notifications are given higher priority than voice pages, then R-DATA SPACH notifications, like voice pages can fill all the time slots in a particular cell and prevent voice pages and other messages from getting through, causing the same problem as described above.

If other messages, such as channel assignments, are given highest priority it poses a different problem. The voice pages and R-DATA SPACH notifications for a particular mobile station can only be transmitted in that mobile station's preassigned time slot. The other messages can be transmitted in any time slot after the mobile has received the page. If the other messages have higher priority, a particular mobile station may not be able to receive calls or short messages even though there are many empty time slots. For example, if the first 14 time slots of a hyperframe are full, so that the first available time slot for a channel assignment is time slot 15, and this situation repeats for several hyperframes, then if mobile station X monitors time slot 15 for its voice pages and R-DATA SPACH notifications and there is a voice page for mobile station X, this voice page may have to wait longer than the time period a voice page is allowed to wait without being transmitted before time slot 15 becomes available. Therefore this voice page will never be transmitted and a call will not go through, even though all the time slots from 16 to 31 may be empty and the channel assignment could have been transmitted in one of those later time slots.

Another problem with this system is that many of the time slots are only partially full. Typically, a message arrives at the base station and is put into a queue, the messages assigned to a particular time slot are queued separately based on the type of message and on the time slot. For example a voice page is put into voice page queue for a particular time slot. The messages that are not assigned to a time slot are put into a queue for those messages, for example a channel assignment message is put into a channel assignment queue. The messages are then taken from the queue and scheduled into messages that are transmitted to the mobile station, known in the industry as airlink messages. The period during which the arrived messages are packaged into the airlink messages for a particular time slot is the time slot construction period. Some arrived messages can be packaged such that several of them fit into an airlink message that fits into one time slot, these messages are packable messages. Voice pages and R-DATA notifications are packable messages. Other arrived messages cannot be packaged so that more than one such message fits into a time slot, and the message may require more than one time slot. For example, a channel assignment typically requires two time slots. These messages are non-packable messages. Message waiting messages and channel assignments are non-packable messages.

There are 109 bits in a time slot. Each time slot has a header that describes what type of message is in the time slot. Voice pages have 7 bit headers and the remaining 102 bits are used to identify the mobile stations being voice paged by their MIN. In North America, currently, a MIN has a three digit area code, a three digit sub code, and a four digit line code, which can be represented by 34 bits. Thus, there is room for three MINs plus the 7 bit header in the 109 bits. Therefore, up to three voice pages can be scheduled to be transmitted in the time slot. Some voice pages that use a mobile identifier that can be represented by less bits than a MIN, such as a temporary mobile station identifier, which is an alias that can be temporarily assigned to the mobile station when it registers with a base station. Using these voice pages, there is room for more than three of the mobile identifiers in the time slot, and therefore more of these voice pages can be scheduled and transmitted in an airlink message. R-DATA SPACH notifications have a 14 bit header, which leaves room for two MINs in the 109 bits of the time slot. Therefore, up to two R-DATA SPACH notifications can be scheduled to be transmitted in the time slot.

A packed airlink message is generated when there are enough of one type of packable messages for a particular time slot such that another packable message of the same type would not fit into the time slot. Therefore, for voice pages that use the MIN as the mobile identifier, three voice pages for the same time slot generate a packed voice page, and two R-DATA SPACH notifications for the same time slot generate a packed R-DATA SPACH notification. An unpacked airlink message contains less packable messages than a packed airlink message.

As explained, a problem with the current system is that a cell may be filled with unpacked pages, which will prevent other messages from getting through yet not utilizing the time slots to capacity.

SUMMARY OF THE INVENTION

The invention solves the above problems by providing a scheduling method that selects one of a plurality of priority schemes for scheduling messages for a time slot of a control channel based on at least one of a plurality of characteristics of the state of the control channel. The messages for the one set of time slots are then scheduled based on the selected priority scheme. The state of the control channel is all the information regarding what has arrived, what is queued, and what has been transmitted. This includes the status of the queues, the messages awaiting transmission, along with their type and the time they have been waiting, the sequence of past transmissions, as well as other information. Some of the characteristics of the state of the control channel include the hyperframe number of the one set of time slots, the number of packable messages in one of the packable message queues for the time slot, and whether there are packable messages in any of the packable message queues for the time slot that have been in the packable message queues for the time slot since at least the end of the time slot construction period of a corresponding time slot of a previous set of cyclically repeating sets of time slots. For example in one embodiment, in a control channel of a TDMA system where the hyperframe number is the characteristic used to select the priority scheme, a priority scheme is selected that assigns a voice page highest priority when the hyperframe number is an even number, and that assigns an R-DATA SPACH notification highest priority when the hyperframe number is an odd number.

In another embodiment of the invention, if there is a packed airlink message, the packed airlink message is scheduled in the time slot. A packed airlink message contains the maximum number of one type of messages as will fit into a time slot. If there are no packed airlink messages, then the method dynamically alters the priority of messages based on whether there is a packable message in any of the packable message queues since at least the end of the time slot construction period of a corresponding time slot of a previous set of time slots. If there are no such messages and there is a non-packable message, the non-packable message is scheduled in the time slot, although if there are no non-packable messages and there is a unpacked airlink message, the unpacked airlink message is scheduled in the time slot. However, if there is a packable messages in any of the packable message queues since at least the end of the time slot construction period of the corresponding time slot of the previous set of time slots, the unpacked airlink message is scheduled in the time slot. Dynamically altering the priority of the messages significantly reduces both the number of messages that are blocked and the number of messages that are timed out.

BRIEF DESCRIPTION OF THE DRAWINGS

FIGS. 2A, 2B and 2C are a flowchart of the priority scheduling of messages for a control channel of a TDMA system where the priority of voice pages and R-DATA SPACH notifications alternate based on the hyperframe number;

DETAILED DESCRIPTION

For ease of reference the method is illustrated using a TDMA system, although the method can be used in with any air interface such as Group Special Mobile (GSM) or Code Division Multiple Access (CDMA), particularly CDMA with a time slotted paging channel.

A priority scheme for scheduling messages in one time slot is an ordering of message types. According to the method a priority scheme is selected for each time slot based on at least one of the characteristics of the state of the control channel. The state of the control channel is all of the information regarding what has arrived, what is queued, and what has been transmitted. This included the status of the queues, the messages awaiting transmission, along with their type and the time they have been waiting, the sequence of past transmissions, as well as other information. The priority schemes can be arranged in a repeating predetermined sequence and the hyperframe number can be used as the characteristic of the state of the control channel that is used to select the scheme. The predetermined sequence can consist of two or more priority schemes each repeated one or more times in the predetermined sequence. For example in one embodiment shown in FIGS. 2A, 2B, and 2C and described hereunder in more detail, a first priority scheme assigns a voice page highest priority, and a second priority scheme assigns an R-DATA SPACH notification highest priority. The predetermined sequence of priority schemes is to alternate between the first and the second priority schemes.

Alternatively, the selection of the priority schemes can be dynamic. Priority schemes would not be arranged in a predetermined order, but would be selected based on one or more of the characteristics of the state of the control channel. Some of the characteristics include the hyperframe number of the time slot, the number of packable messages in one of the packable message queue for the time slot, the length of time packable messages have been stored in one of the packable message queues for the time slot, the type of message transmitted in a corresponding time slot of a previous hyperframe, whether there are packable messages in any of the packable message queue for the time slot that have been in the packable message queues for the time slot since at least the end of the time slot construction period of a corresponding time slot of a previous hyperframe.

Figures 1A, 1B:
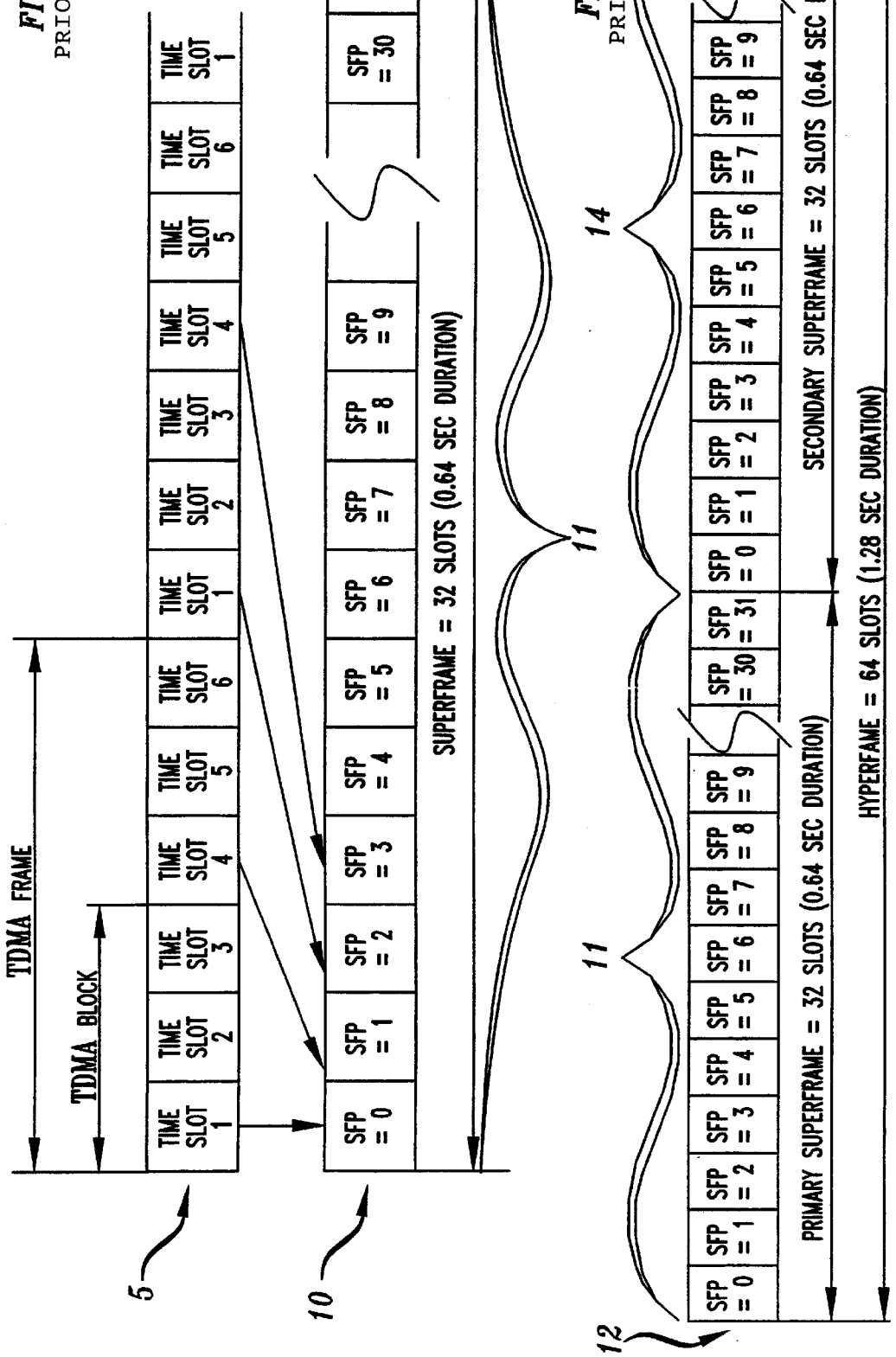
FIG. 1A illustrates time slots in a TDMA system.
FIG. 1B illustrates a hyperframe in a TDMA system.
Figure 2B:
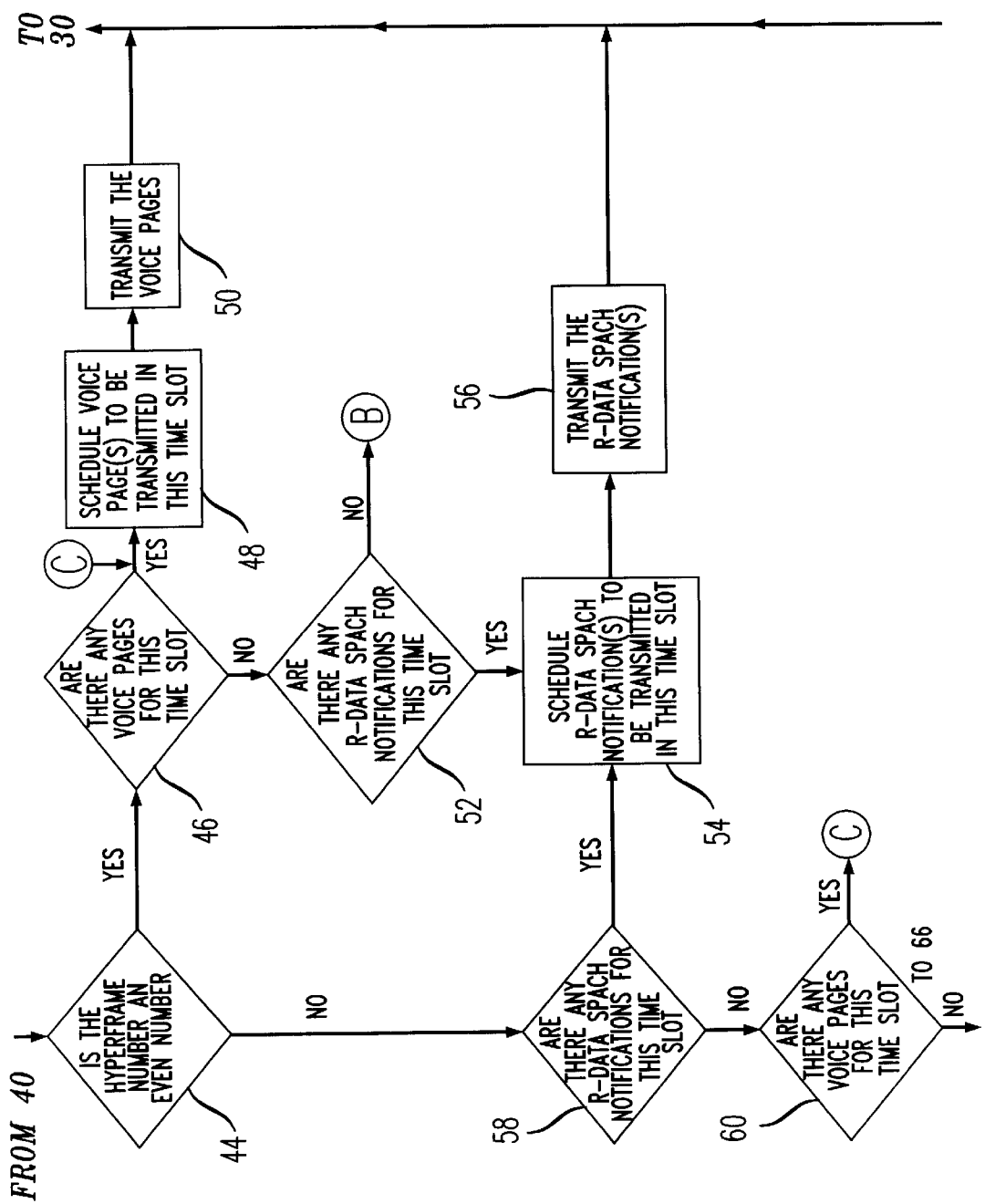
Figure 2C:
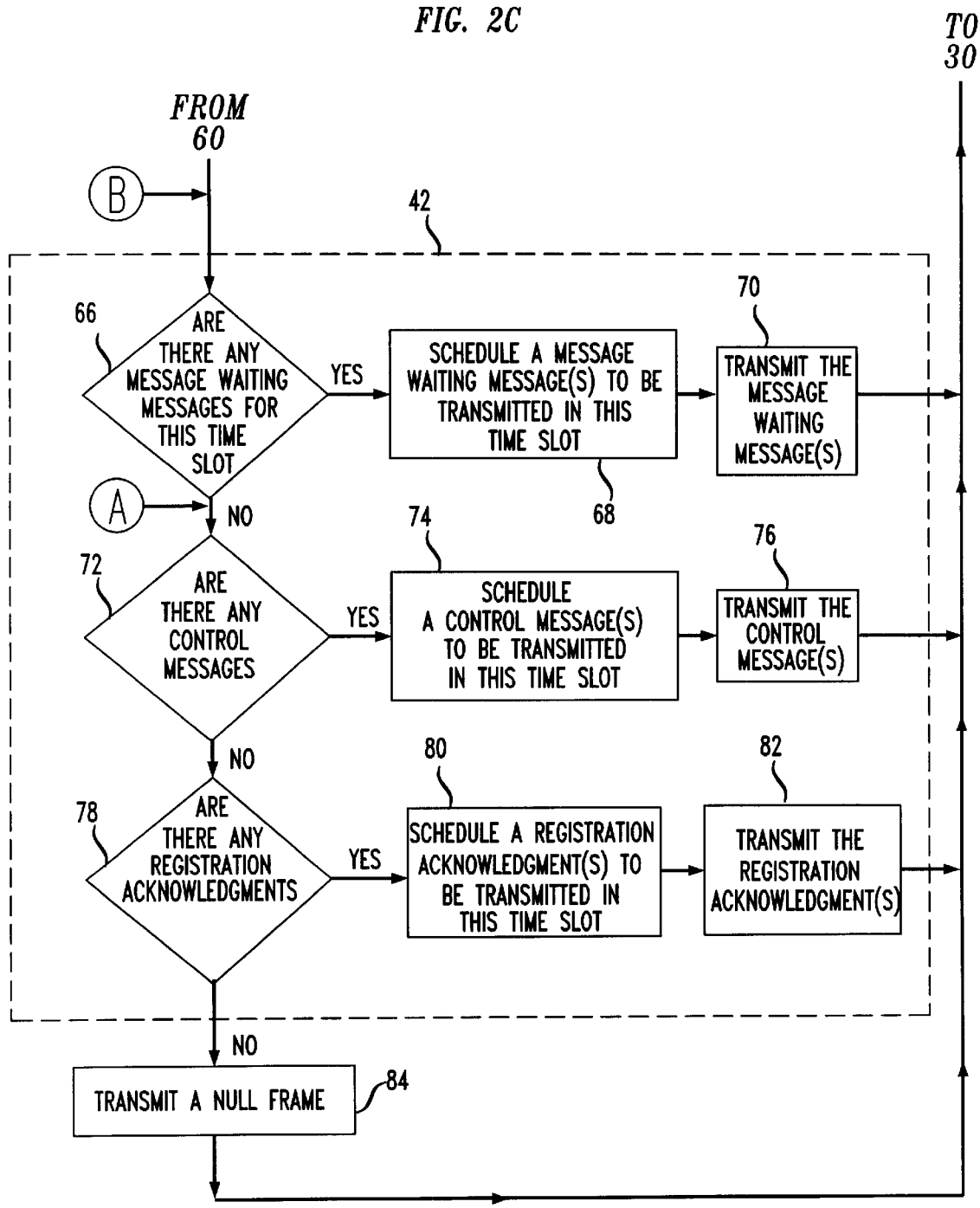

Referring to FIGS. 2A, 2B, and 2C one example of a method that uses the hyperframe number as the characteristic that selects a priority scheme of scheduling messages in a time slot on a time slotted control channel is shown. This method alternates which messages get higher priority to achieve a better distribution of the messages transmitted, thereby reducing the number of timed out messages. In particular, a first type message is assigned highest priority in an even numbered hyperframe, and a second type message is assigned highest priority in an odd numbered hyperframe. For example, a voice page is assigned highest priority in an even numbered hyperframe, and an R-DATA SPACH notification is assigned highest priority in an odd numbered hyperframe.

Referring to FIG. 2A, the method starts with proceeding to the next time slot of the control channel at step 30. At step 32 it is determined if this time slot is reserved for a broadcast message. In each superframe there are a certain number of time slots reserved for broadcast messages. If this time slot is reserved for a broadcast message then at step 34 a broadcast message is scheduled to be transmitted in the time slot. At step 36, the broadcast message is transmitted. The method then returns to step 30 to proceed to the next time slot.

If at step 32 it is determined that the time slot is not reserved for a broadcast message then step 38 determines whether this time slot is in a primary superframe of this hyperframe. If it is, then step 40 determines whether this time slot is reserved for a non-page. Reserving time slots for non-pages ensures that if there are non-pages to be transmitted, then at least some of them will be transmitted in each superframe. The time slots that are not reserved can contain either non-pages or pages for the mobile stations assigned to the time slot. If this time slot is reserved for a non-page then the method proceeds to input A of block 42 described hereunder in more detail. Optionally, no time slots may be reserved for non-pages and step 32 is skipped.

Referring to FIG. 2B, if this time slot is not reserved for a non-page then at step 44 it is determined whether the hyperframe number is an even number. If it is even, then step 46 determines whether there are any voice pages for the mobile stations assigned to this time slot, i.e. are there any voice pages for this time slot. If there are voice pages for this time slot then at step 48 the voice pages for this time slot are scheduled to be transmitted in the time slot. At step 50 the voice pages are transmitted. The method then returns to step 30 to proceed to the next time slot.

If at step 46 there are no voice pages for this time slot, the method goes to step 52 and it is determined if there are any R-DATA SPACH notifications for mobile stations assigned to this time slot, i.e. are there any R-DATA SPACH notifications for this time slot. If there are R-DATA DATA SPACH notifications then the method goes to step 54 and the R-DATA SPACH notifications for this time slot are scheduled to be transmitted. At step 56 the R-DATA SPACH notifications are transmitted. The method then returns to step 30 to proceed to the next time slot. If there are no voice pages or R-DATA SPACH notifications for this time slot then the method proceeds to input B of block 42 described hereunder in more detail.

If at step 44 the hyperframe number is not an even number, then step 58 determines whether there are any R-DATA SPACH notifications for this time slot. If there are R-DATA SPACH notifications for this time slot then at step 54 the R-DATA SPACH notifications for this time slot are scheduled to be transmitted. At step 56 the R-DATA SPACH notifications are transmitted. The method then returns to step 30 to proceed to the next time slot. If at step 58 there are no R-DATA SPACH notifications for this time slot, then step 60 determines whether there are any voice pages for this time slot. If there are voice pages for this time slot, then the method proceeds to step 48 where the voice pages for this time slot are scheduled to be transmitted in the time slot. At step 50 the voice pages are transmitted, and the method then returns to step 30 to proceed to the next time slot. If there are no R-DATA SPACH notifications and no voice pages for this time slot, then the method proceeds to input B of block 42 described hereunder in more detail.

If there are no voice pages or R-DATA SPACH notifications for this time slot then in block 42 non-packable messages are scheduled to be transmitted in this time slot. Referring to FIG. 2C, step 66 determines whether there are any message waiting messages for this time slot. A message waiting message signals the mobile station that there is a voice or data message stored for the mobile station waiting to be retrieved. The voice or data message can be stored either in the mobile station's memory or in the wireless communication system. If there are message waiting messages for this time slot then at step 68 they are scheduled to be transmitted in this time slot. The message waiting message(s) are transmitted at step 70 and the method then returns to step 30 to proceed to the next time slot. If there are no message waiting messages for this time slot, at step 72 it is determined if there are any control messages. Control messages are messages that are used to set up a call. Control messages include such messages as channel assignments. If it is determined at step 72 that there are any control messages, a control message is scheduled to be transmitted in this time slot at step 74. At step 76 the control message is transmitted and the method then returns to step 30 to proceed to the next time slot. If there are no control messages, step 78 determines whether there are any registration acknowledgements. If there are any registration acknowledgements, the registration acknowledgement(s) are scheduled to be transmitted in this time slot at step 80, the registration acknowledgements are transmitted at step 82, and the method then returns to step 30 to proceed to the next time slot. If no messages are scheduled to be transmitted then at step 84 a null frame is transmitted, and the method then returns to step 30 to proceed to the next time slot.

The order of determining if there is a specific type of non-packable message and the associated scheduling and transmission of the non-packable messages can be rearranged based on the requirements of the wireless telecommunication system. Furthermore, based on the requirements of the wireless telecommunication system, other packable messages can be added to block 42 in addition to or in place of the messages in the non-packable block. Additionally, although this embodiment is described using pages and R-DATA SPACH notifications as the messages having highest priority, any message types, including non-packable messages, can be six used as the messages to which highest priority is given in alternating hyperframe numbers, and the number of message types whose priorities are altered can be increased.

Referring again to FIG. 2A, returning to step 38, it it is determined at step 38 that this is not the primary but the secondary superframe of this hyperframe, then step 90 determines whether the message transmitted in the corresponding time slot of the corresponding primary superframe is a page. Since pages are repeated in corresponding time slots of both superframes of the hyperframe, if there is a page in the corresponding time slot then at step 92 the same page is scheduled to be transmitted in this time slot. At step 94 the page is transmitted, and the method then returns to step 30 to proceed to the next time slot. If at step 30 the answer is no, then a non-page can be transmitted in this time slot, therefore the method proceeds to input A of block 42.

Table 2 is simulation showing the blocked messages and timed out messages for a control channel based on voice page arrival rate given as a percentage of the control channel's voice page capacity in one system using the alternating priority method where each control channel has 300 buffers. Comparing Table 2 to Table 1, the number of timed out messages for all of the message types except message waiting is reduced. The number of timed out R-DATA SPACH notifications is reduced drastically, allowing more short messages to be sent over the system even when the system is busy. Although the number of blocked messages is not reduced, the total number of blocked and timed out messages is reduced, thereby improving the performance of the system.

TABLE 2

Alternating Priority Method

| voice page load | 10% | 15% | 20% | 25% | 30% | 35% |
|---|---|---|---|---|---|---|
| Voice pages/hour | 16,031 | 24,047 | 32,063 | 40,078 | 48,094 | 56,109 |
| Queue-MAX | 18 | 23 | 31 | 42 | 60 | 170 |
| Blocked Messages/hour | 0 | 0 | 0 | 0 | 0 | 0 |
| Timed Out - voice pages/hour | 0 | 0 | 0 | 0 | 0 | 0 |

TABLE 2-continued

| | | | | | | |
|---|---|---|---|---|---|---|
| Timed Out - channel assignments/hour | 0 | 0 | 0 | 0 | 0 | 0 |
| Timed Out - message waiting/hour | 0 | 0 | 0 | 0 | 0 | 1 |
| Timed Out - R-DATA SPACH notifications/hr | 0 | 0 | 0 | 0 | 0 | 0 |
| Timed Out - registration acknowledgements/hr. | 0 | 0 | 0 | 0 | 0 | 0 |
| Total (Timed Out + Blocked messages)/min | 0 | 0 | 0 | 0 | 0 | 0 |

| voice page load | 40% | 45% | 50% | 55% | 60% |
|---|---|---|---|---|---|
| Voice pages/hour | 64,125 | 72,141 | 80,156 | 88,172 | 96,188 |
| Queue-MAX | 300 | 300 | 300 | 300 | 300 |
| Blocked Messages/hour | 2,966 | 10,573 | 18,240 | 25,753 | 33,849 |
| Timed Out - voice pages/hour | 0 | 0 | 0 | 0 | 0 |
| Timed Out - channel assignments/hour | 0 | 0 | 0 | 0 | 0 |
| Timed Out - message waiting/hour | 111 | 130 | 86 | 74 | 109 |
| Timed Out - R-DATA SPACH notifications/hr | 0 | 0 | 0 | 0 | 0 |
| Timed Out - registration acknowledgements/hr. | 0 | 0 | 0 | 0 | 0 |
| Total (Timed Out + Blocked messages)/min | 51 | 178 | 305 | 430 | 566 |

Figure 3A:
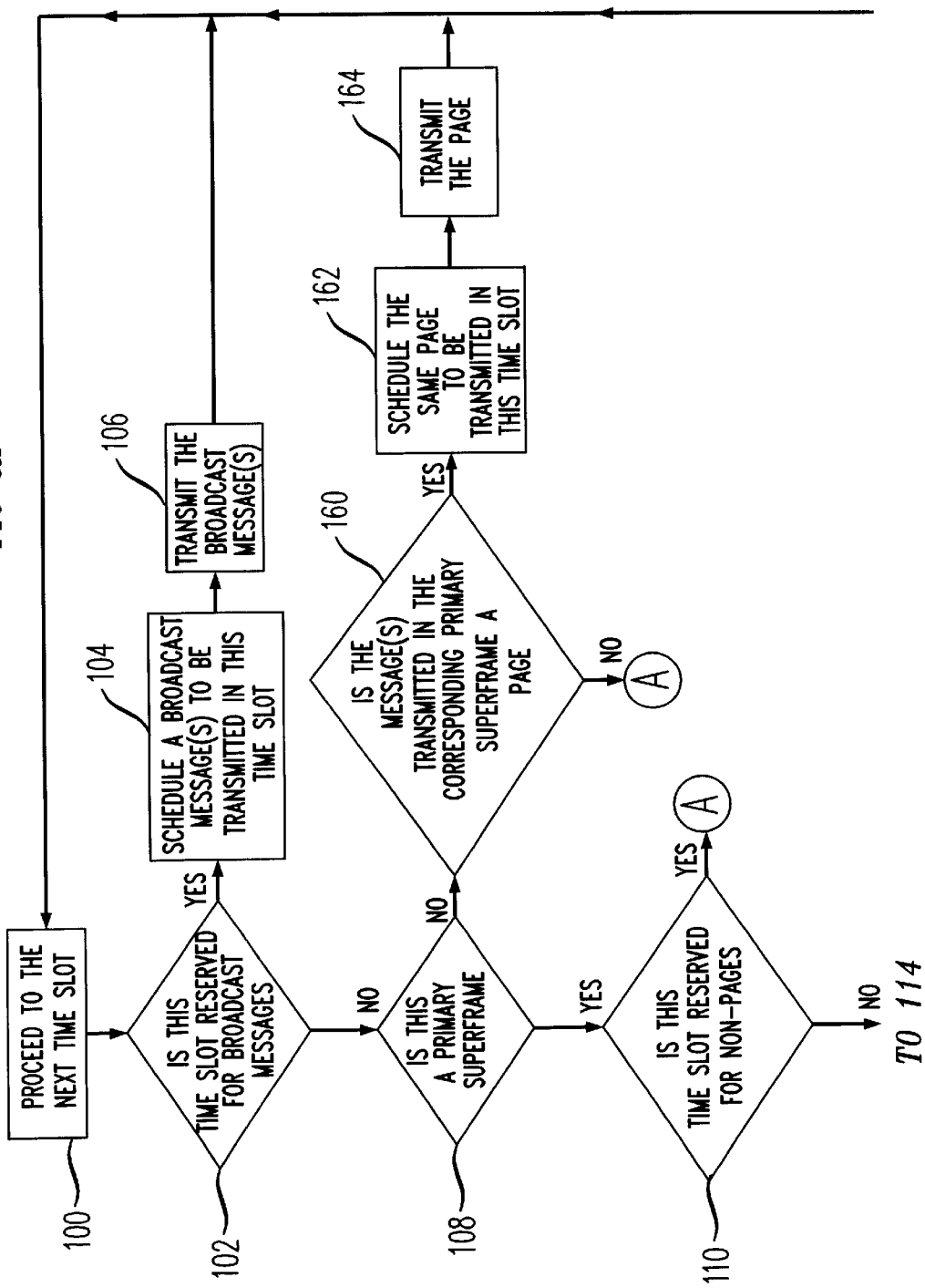
FIGS. 3A, 3B and 3C are a flowchart of the priority scheduling of messages for a control channel of a TDMA system where the priority of voice pages and R-DATA SPACH notifications alternate based on the type of message that was transmitted in the corresponding time slot of the prior hyperframe.
Figure 3B:
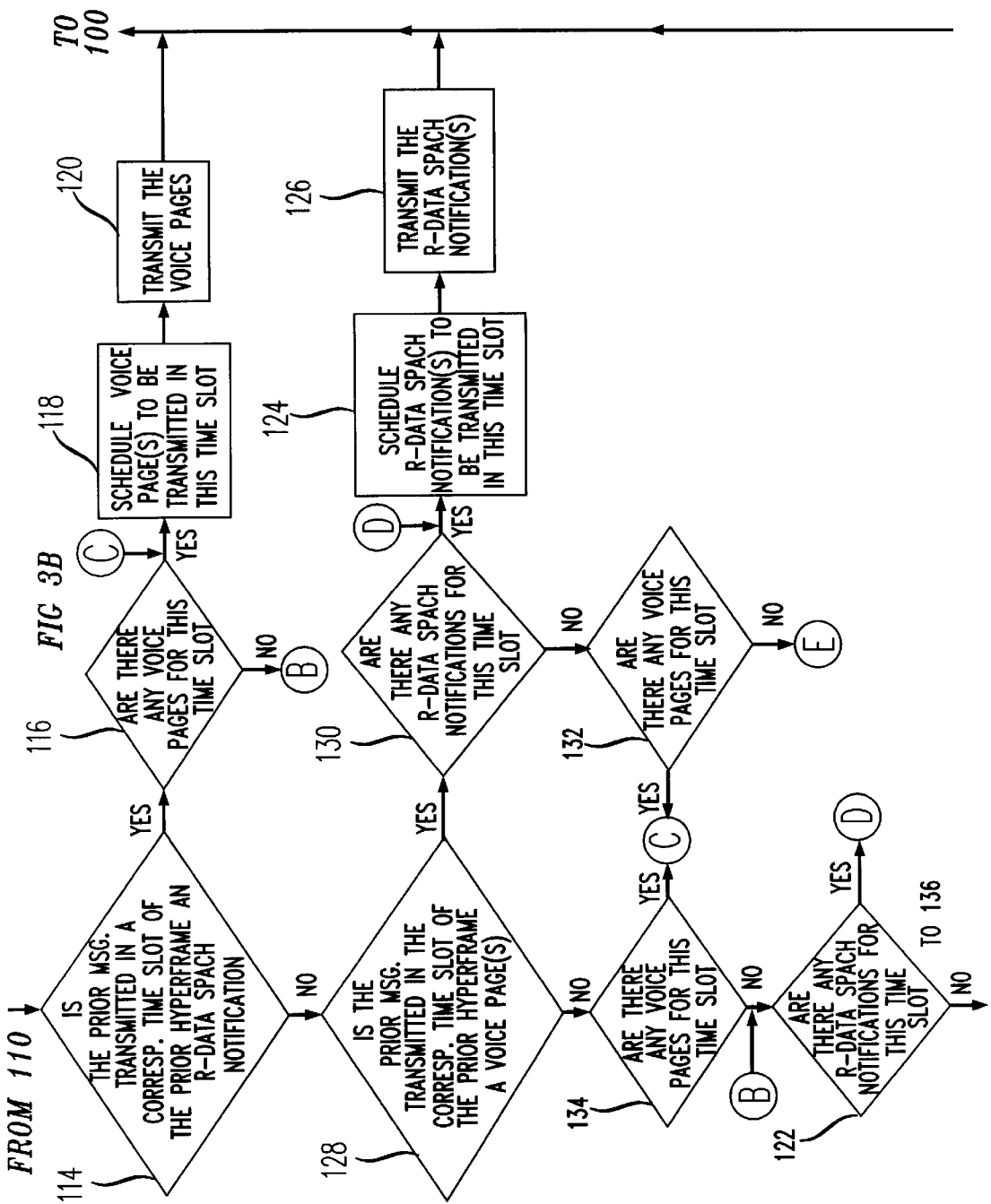
Figure 3C:
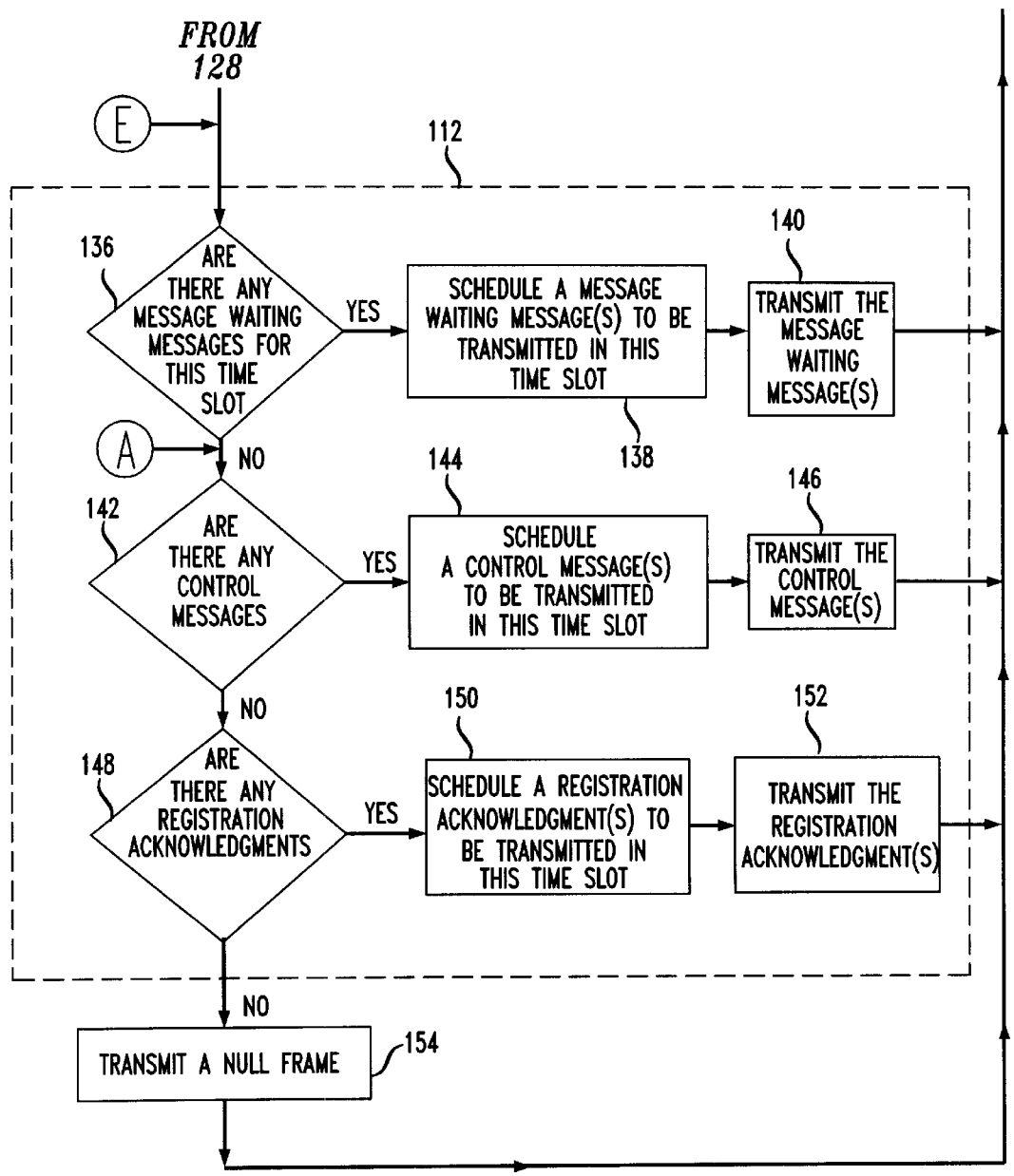

Referring to FIGS. 3A, 3B, and 3C an embodiment of a method of dynamic selecting priority schemes based on one or more of the characteristics of the state of the control channel is shown. In this embodiment, the method uses the type of message that was transmitted in the corresponding time slot of the prior hyperframe to select the priority scheme for scheduling messages in the time slot of control channel. This method alternates which messages get higher priority to achieve a better distribution of the messages transmitted. In one embodiment, the method alternates the priority of first and second type messages to achieve a better distribution of the messages transmitted thereby reducing the number of timed out messages. In particular, a first type message is assigned highest priority in a time slot when a prior message transmitted in a corresponding time slot of a prior cyclically repeating set of time slots was a second type message. The second type message is assigned highest priority in the time slot when the prior message transmitted in the corresponding time slot of the prior cyclically repeating set of time slots was the first type message. For example, a voice page is assigned highest priority in a time slot when an R-DATA SPACH notification was transmitted in a corresponding time slot of a prior hyperframe, and an R-DATA SPACH notification is assigned highest priority in the time slot when a voice page was transmitted in the corresponding time slot of the prior hyperframe.

Referring to FIG. 3A, the method starts with proceeding to the next time slot of the control channel at step 100. At step 102 it is determined if this time slot is reserved for a broadcast message. If this time slot is reserved for a broadcast message then at step 104 a broadcast message is scheduled to be transmitted in the time slot. At step 106, the broadcast message is transmitted. The method then returns to step 100 to proceed to the next time slot.

If at step 102 it is determined that the time slot is not reserved for a broadcast message then step 108 determines whether this time slot is in a primary superframe of this hyperframe. If it is, then step 110 determines whether this time slot is reserved for a non-page. If this time slot is reserved for a non-page then the method proceeds to input A of block 112 described hereunder in more detail.

Referring to FIG. 3B, if this time slot is not reserved for a non-page then at step 114 it is determined if a prior message transmitted in a corresponding time slot of a prior hyperframe was an R-DATA SPACH notification. If yes, then step 116 determines whether there are any voice pages for this time slot. If there are voice pages for this time slot then at step 118 the voice pages for this time slot are scheduled to be transmitted in the time slot. At step 120 the voice pages are transmitted. The method then returns to step 100 to proceed to the next time slot.

If at step 116 there are no voice pages for this time slot, the method goes to step 122 and it is determined if there are any R-DATA SPACH notifications for this time slot. If there are R-DATA SPACH notifications then the method goes to step 124 and the R-DATA SPACH notifications for this time slot are scheduled to be transmitted. At step 126 the R-DATA SPACH notifications are transmitted. The method then returns to step 100 to proceed to the next time slot. If there are no voice pages or R-DATA SPACH notifications for this time slot then the method proceeds to input E of block 112 described hereunder in more detail.

If at step 114 the prior message transmitted in the corresponding time slot of a prior hyperframe was not an R-DATA SPACH notification then step 128 determines whether the prior message transmitted in the corresponding time slot of the prior hyperframe was a voice page. If yes, then at step 130 it is determined if there are any R-DATA SPACH notifications for this time slot. If there are R-DATA SPACH notifications for this time slot then at step 124 the R-DATA SPACH notifications for this time slot are scheduled to be transmitted. At step 126 the R-DATA SPACH notifications are transmitted. The method then returns to step 100 to proceed to the next time slot. If at step 130 there are no R-DATA SPACH notifications for this time slot, then step 132 determines whether there are any voice pages for this time slot. If there are voice pages for this time slot, then the method proceeds to step 118 where the voice pages for this time slot are scheduled to be transmitted in the time slot. At step 120 the voice pages are transmitted, and the method then returns to step 100 to proceed to the next time slot. If there are no R-DATA SPACH notifications and no voice pages for this time slot then the method proceeds to input E of block 112 described hereunder in more detail.

If at step 128 it is determined that the prior message transmitted in the corresponding time slot of the prior hyperframe was not a voice page, then step 134 determines whether there are any voice pages for this time slot. If there are voice pages for this time slot then the method proceeds to step 118 where the voice pages for this time slot are scheduled to be transmitted. At step 120 the voice pages are transmitted, and the method then returns to step 100 to proceed to the next time slot. If there are no voice pages for the time slot at step 134, then at step 122 it is determined if there are any R-DATA SPACH notifications for this time slot. If the answer is yes, the method proceeds to step 124 and the R-DATA SPACH notifications for this time slot are scheduled to be transmitted. At step 126 the R-DATA SPACH notifications are transmitted, and the method then returns to step 100 to proceed to the next time slot. The order of step 134 and 122 that determine whether there are voice pages and R-DATA SPACH notifications can be reversed. Furthermore, the order of steps 114 and 128 can also be reversed.

If there are no voice pages or R-DATA SPACH notifications for this time slot then in block 112 non-packable messages are scheduled to be transmitted in this time slot. Referring to FIG. 3C, step 136 determines whether there are any message waiting messages for this time slot. If there are message waiting messages for this time slot then at step 138 they are scheduled to be transmitted in this time slot. The message waiting message(s) are transmitted at step 140 and the method then returns to step 100 to proceed to the next time slot. If there are no message waiting messages for this time slot, at step 142 it is determined if there are any control messages. Control messages are messages that are used to set up a call. Control messages include such messages as channel assignments. If it is determined at step 142 that there are any control messages, a control message is scheduled to be transmitted in this time slot at step 144. At step 146 the control message is transmitted and the method then returns to step 100 to proceed to the next time slot. If there are no control messages, step 142 determines whether there are any registration acknowledgements at step 148. If there are any registration acknowledgements, the registration acknowledgement(s) are scheduled to be transmitted in this time slot at step 150, the registration acknowledgements are transmitted at step 152, and the method then returns to step 100 to proceed to the next time slot. The order of determining if there is a specific type of non-packable message and the associated scheduling and transmission of the non-packable messages can be rearranged based on the requirements of the wireless telecommunication system. If no messages are scheduled to be transmitted then at step 154 a null frame is transmitted.

Based on the requirements of the wireless telecommunication system, other messages can be added to block 112 in addition to or in place of the messages in the non-packable block. Additionally, although this embodiment is described using pages and R-DATA SPACH notifications as the messages having highest priority, any message types, including non-packable messages, can be used as the messages to receive highest priority based on the message type transmitted last.

Referring again to FIG. 3A, returning to step 108, if it is determined at step 108 that this is not the primary but the secondary superframe of this hyperframe, then step 160 determines whether the message transmitted in the corresponding time slot of the corresponding primary superframe is a page. Since pages are repeated in corresponding time slot of both superframes of the hyperframe, if there is a page in the corresponding time slot then at step 162 the same page is scheduled to be transmitted in this time slot. At step 164 the page is transmitted, and the method then returns to step 100 to proceed to the next time slot. If at step 160 the answer is no, then a non-page can be transmitted in this time slot, therefore the method proceeds to input A of block 112.

FIGS. 4A, 4B, 4C, 4D, and 4E show another embodiment of the method of scheduling messages on a time slotted control channel that further improves the performance of the wireless telecommunications system by reducing both the number of messages that are blocked and the number of messages that are timed out. This method assigns priority to messages based on whether there are packable messages in the packable message queue since at least the end of the time slot construction period of the corresponding time slot of the previous hyperframe, and whether there are packed airlink messages. As described above a packed airlink message is generated when there are enough of one type of packable messages for a particular time slot such that another packable message of the same type would not fit into the time slot. For voice pages that use MIN as the mobile identifiers, up to three voice pages fit into the 109 bit time slots of a North American TDMA system, therefore three voice pages for the same time slot generate a packed voice page. Two R-DATA SPACH notifications fit into the 109 bit time slots of a North American TDMA system, therefore two R-DATA SPACH notifications for the same time slot generate a packed R-DATA SPACH notification.

According to the method, if there is a packed airlink message, the packed airlink message is scheduled in the time slot. If there are no packed airlink messages, then the priority of the messages is based on whether there is a packable message in the packable message queue for the time slot since at least the end of the time slot construction period of the corresponding time slot of the previous hyperframe. If there are no such messages in the packable message queue for the time slot and there is a non-packable message, the non-packable message is scheduled in the time slot. If there are no messages in the packable message queue for the time slot and there are no non-packable messages and there is a unpacked airlink message, the unpacked airlink message is scheduled in the time slot. If there is a packable message in the packable message queue for the time slot since at least the end of the time slot construction period of the corresponding time slot of the previous hyperframe, the unpacked airlink message is scheduled in the time slot.

Figure 4A:
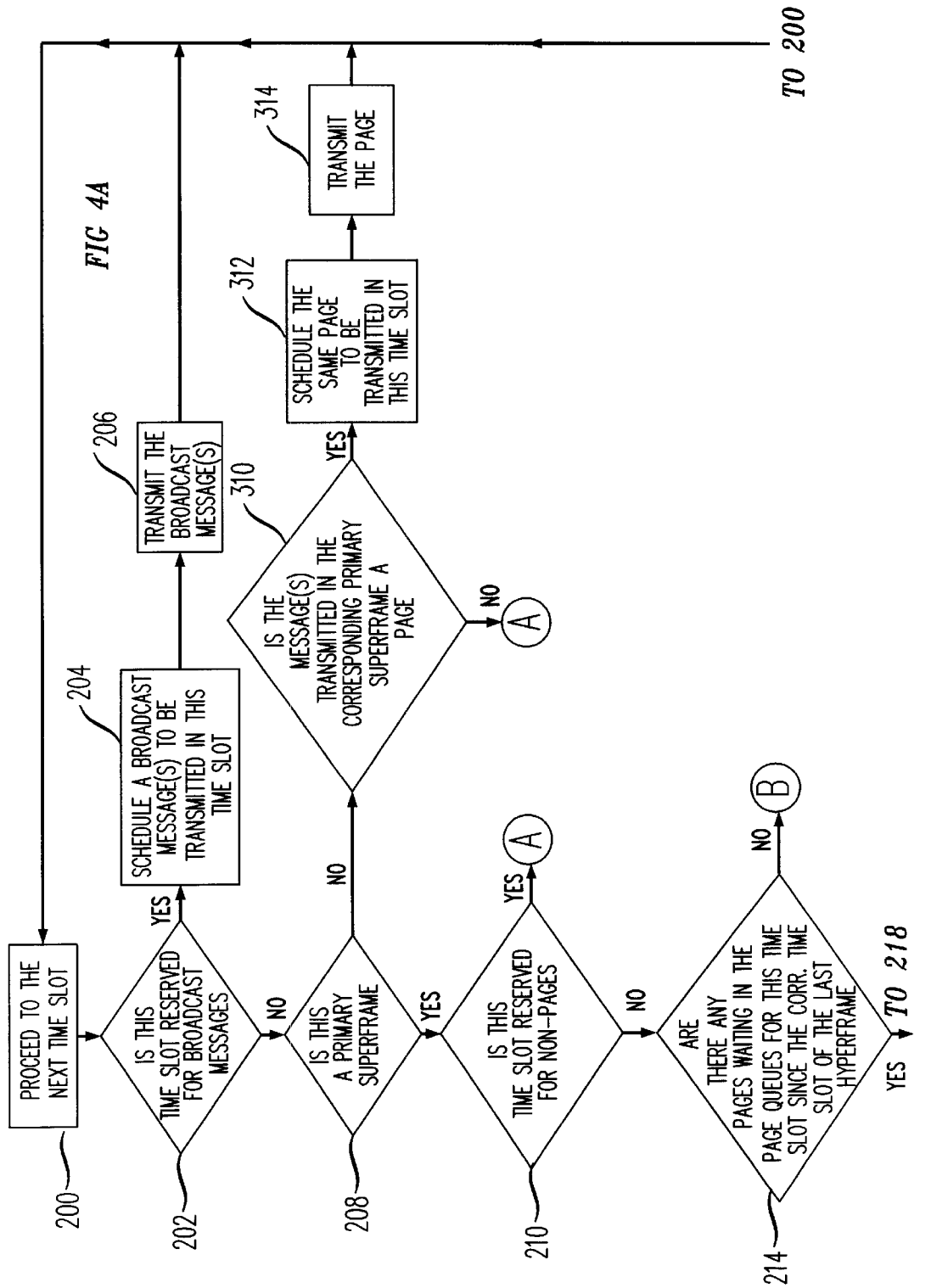
FIGS. 4A, 4B, 4C, 4D and 4E are a flow chart of the priority scheduling of messages for a control channel of a TDMA system where the priority of the messages is based on whether there is a packable message in any of the packable message queues since at least the end of the time slot construction period of the corresponding time slot of the previous hyperframe.

Referring to FIG. 4a, this method starts with proceeding to the next time slot of the control channel at step 200, and at step 202 it is determined if this time slot is reserved for a broadcast message. If this time slot is reserved for a broadcast message then at step 204 a broadcast message is scheduled to be transmitted in the time slot, the broadcast message is transmitted at step 206, and the method then returns to step 200 to proceed to the next time slot.

If this time slot is not reserved for a broadcast message then step 208 determines whether this is the primary superframe of this hyperframe. If this is the primary superframe then at step 210 it is determined if this time slot is reserved for non-pages. If this time slot is reserved for non-pages then the method proceeds to input A of the non-packable block 212 described hereunder in more detail.

If this time slot is not reserved for a non-page, then step 214 determines whether there are any messages in either the voice page queue for this time slot or the R-DATA SPACH notification queue for this time slot that have been in the queue since at least the end of the time slot construction period of the corresponding time slot of the previous hyperframe. If there are messages in the voice page or R-DATA SPACH notification queues that have been in the queue since at least the end of the time slot construction period of the corresponding time slot of the previous hyperframe then the method proceeds to step 218, shown in FIG. 4B. If there are no messages in the voice page or R-DATA SPACH notification queues that have been in the queue since at least the end of the time slot construction period of the corresponding time slot of the previous hyperframe then the method proceeds to input B, shown in FIG. 4D.

Figure 4B:
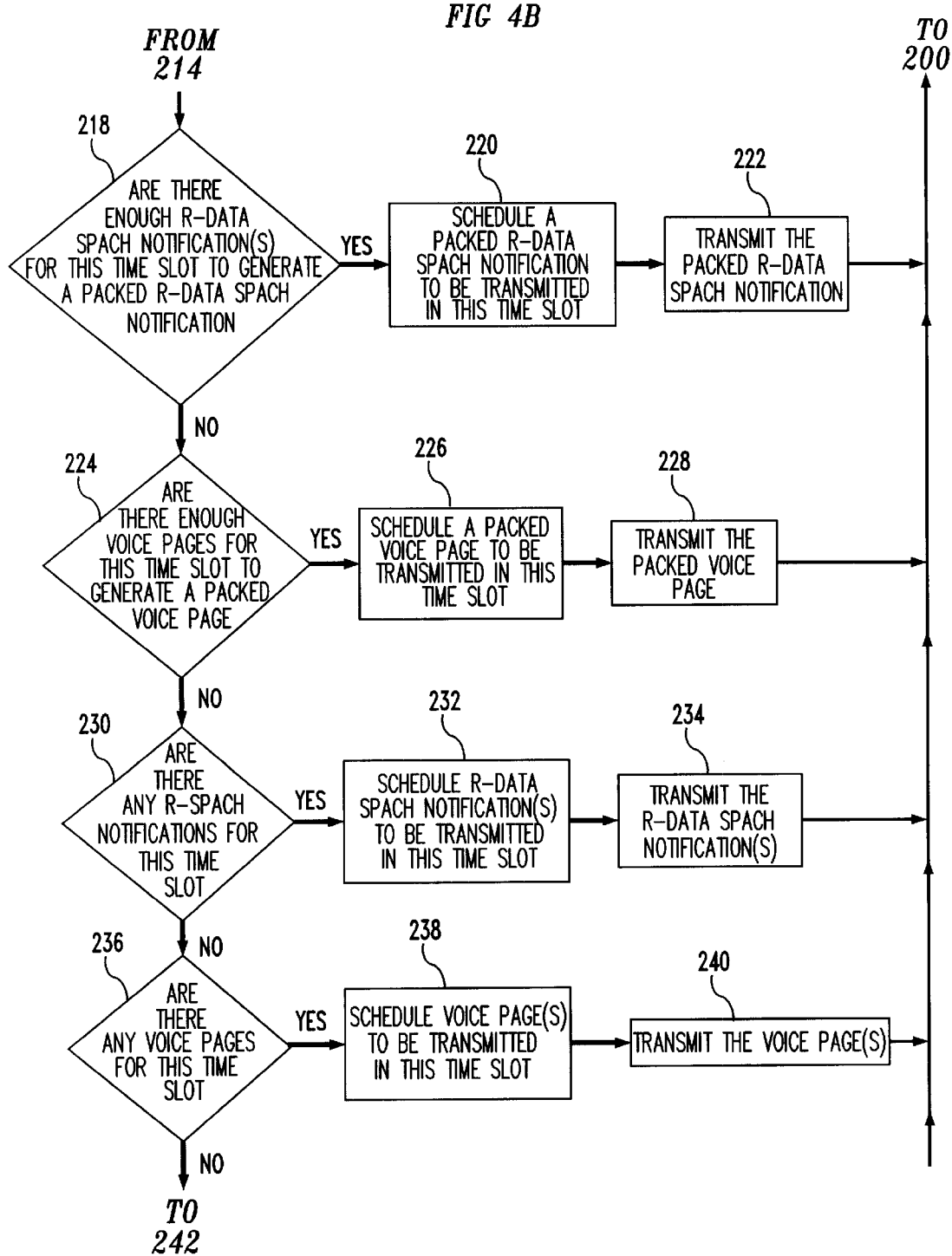

Referring to FIG. 4B, step 218 determines whether there are enough R-DATA SPACH notifications for this time slot to generate a packed R-DATA SPACH notification. If there are enough R-DATA SPACH notifications to generate a packed R-DATA SPACH notification, at step 220 the packed R-DATA SPACH notification is scheduled to be transmitted. The packed R-DATA SPACH notification is transmitted at step 222, and the method then returns to step 200 to proceed to the next time slot.

If at step 218 it is determined that there are not enough R-DATA SPACH notifications to generate a packed R-DATA SPACH notification, step 224 determines whether there are enough voice pages for this time slot to generate a packed voice page. If there are enough voice pages to generate a packed voice page, at step 226 the packed voice page is scheduled to be transmitted in this time slot. The packed voice page is transmitted at step 228, and the method then returns to step 200 to proceed to the next time slot. The order of steps 218 and 224 can be reversed.

If there are not enough voice pages or R-DATA SPACH notifications to generate the packed voice page or packed R-DATA SPACH notification, at step 230 it is determined if there are any R-DATA SPACH notifications for this time slot. If there are, then at step 232 all of the R-DATA SPACH notifications for this time slot are scheduled to be transmitted in this time slot. At step 234 the R-DATA SPACH notifications are transmitted, and the method then returns to step 200 to proceed to the next time slot.

If there are no R-DATA SPACH notifications for this time slot, step 236 determines whether there are any voice pages for this time slot. If there are, then at step 238 all of the voice pages for this time slot are scheduled to be transmitted in this time slot, the voice pages are transmitted at step 240, and the method then returns to step 200 to proceed to the next time slot. The order of steps 230 and 236 of determining whether there are any R-DATA SPACH notifications and voice pages can be reversed.

Figure 4C:
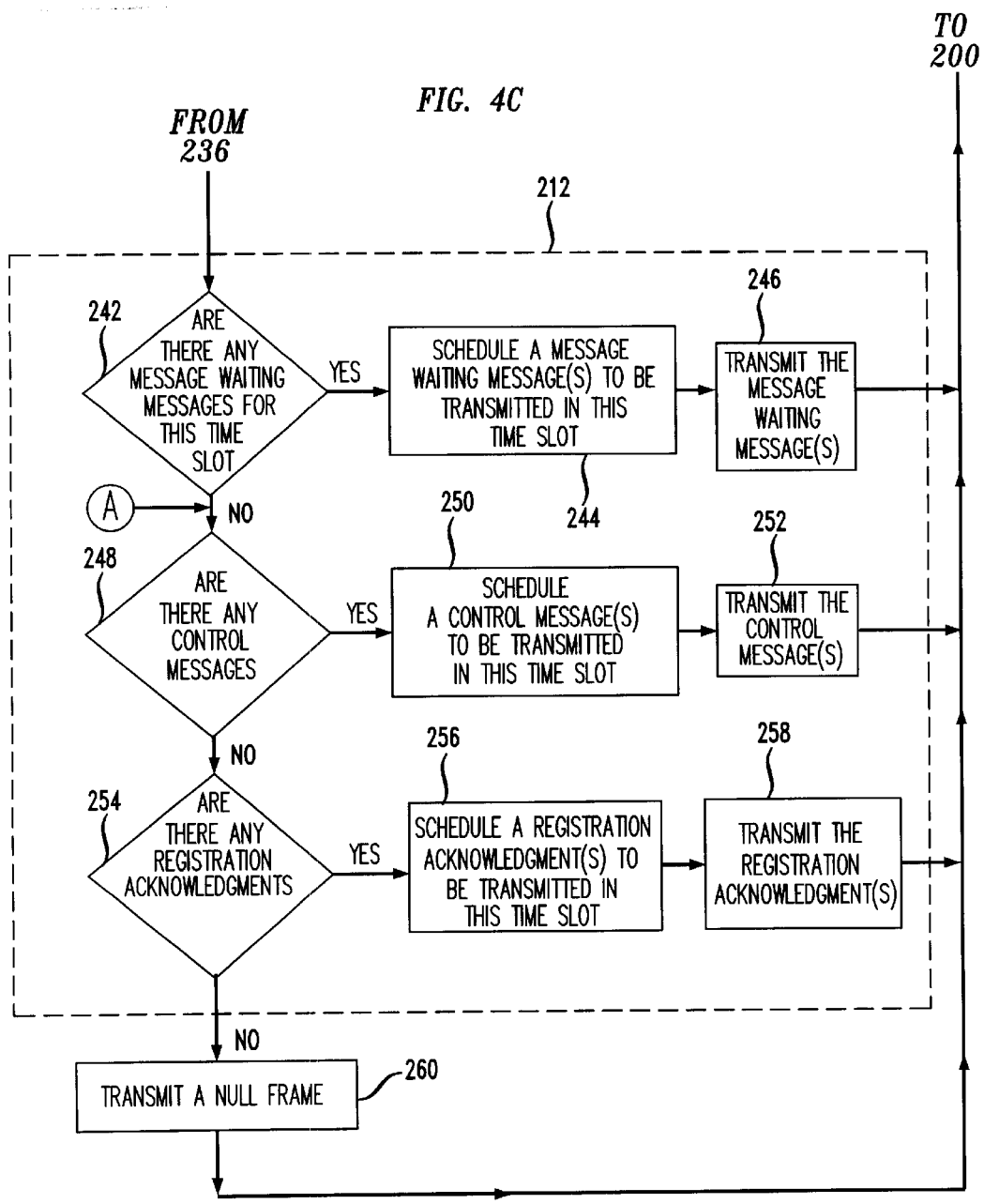

If there are no voice pages or R-DATA SPACH notifications for this time slot then in non-packable block 212 the non-packable messages are scheduled to be transmitted in this time slot. Referring to FIG. 4C, at step 242 it is determined if there are any message waiting messages for this time slot. If there are message waiting messages for this time slot, at step 244 they are scheduled to be transmitted in this time slot. The message waiting message(s) are transmitted at step 246, and the method then returns to step 200 to proceed to the next time slot. If there are no message waiting messages, step 248 determines whether there are any control messages, and if there are, a control message is scheduled to be transmitted in this time slot at step 250. At step 252 the control message is transmitted, and the method then returns to step 200 to proceed to the next time slot. If there are no control messages then step 254 determines whether there are any registration acknowledgements. If there are any registration acknowledgements then at step 256 registration acknowledgement(s) are scheduled to be transmitted in this time slot. The registration acknowledgement(s) are transmitted at step 258, and the method then returns to step 200 to proceed to the next time slot. The order of checking if there is a specific type of non-packable message and the associated scheduling and transmission of the non-packable messages can be rearranged based on the requirements of the wireless telecommunication system. Furthermore, based on the requirements of the wireless telecommunication system, other messages can be added to the non-packable block 212 in addition to or in place of the messages in the non-packable block. If there are no messages to be transmitted in this time slot, then at step 260 a null frame is transmitted and the method then returns to step 200 to proceed to the next time slot.

Figure 4D:
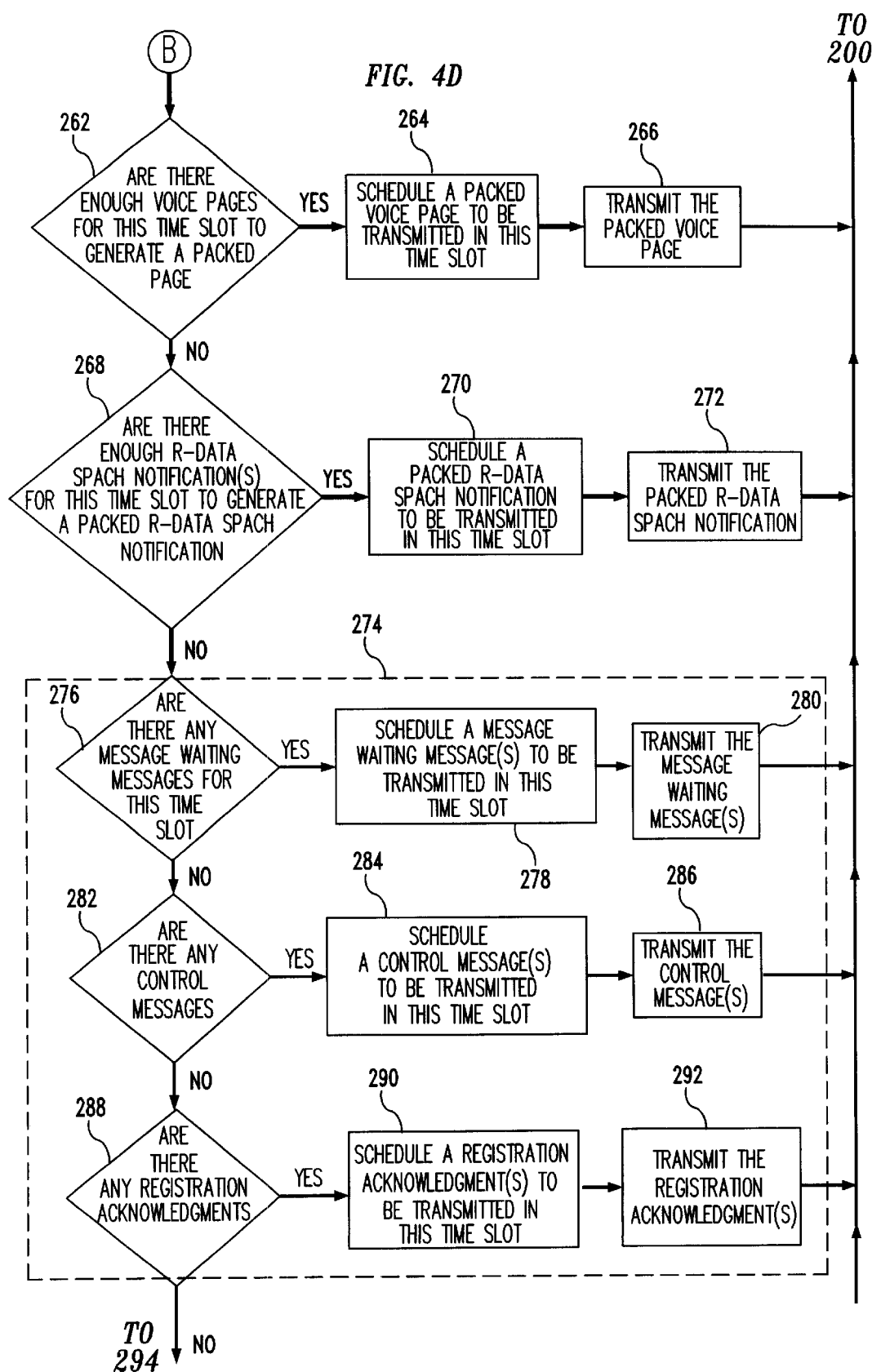

Returning to step 214, if there are no messages in the voice page or R-DATA SPACH notification queue proceed to input B, step 262. Referring to FIG. 4D, step 262 determines whether there are enough voice pages for this time slot to generate a packed voice page. If yes, at step 264 the packed voice page is scheduled to be transmitted in this time slot. The packed voice page is transmitted at step 266, and the method then returns to step 200 to proceed to the next time slot.

If at step 262 there are not enough voice pages to generate the packed voice page, then at step 268 check if there are enough R-DATA SPACH notifications for this time slot to generate a packed R-DATA SPACH notification. If yes, at step 270 a packed R-DATA SPACH notification is scheduled to be transmitted in this time slot. The packed R-DATA SPACH notification is transmitted at step 272, and the method then returns to step 200 to proceed to the next time slot. The order of step 262 and 268 can be reversed. It is preferable for the order of determining whether there are enough voice pages and R-DATA SPACH notifications when there is message in one of the queues to be opposite of the order of determining whether there are enough voice pages and R-DATA SPACH notifications when there is no message in either of the queues. Alternating the order achieves a better distribution of the unpacked airlink messages.

If there are no packed voice pages or packed R-DATA SPACH notifications for this time slot then in non-packable block 274 non-packable messages are scheduled to be transmitted in this time slot. At step 276 it is determined if there are any message waiting messages for this time slot. If there are message waiting messages for this time slot, at step 278 message waiting message(s) are scheduled to be transmitted in this time slot. The message waiting message(s) are transmitted at step 280, and the method then returns to step 200 to proceed to the next time slot. If there are no message waiting messages, step 282 determines whether there are any control messages, and if there are, then at step 284 the control message(s) are scheduled to be transmitted in this time slot. At step 286 the control message is transmitted, and the method then returns to step 200 to proceed to the next time slot. If there are no control message step 288 determines whether there are any registration acknowledgements. If there are any registration acknowledgements, the registration acknowledgement(s) are scheduled to be transmitted in this time slot at step 290, the registration acknowledgement(s) are transmitted at step 292, and the method then returns to step 200 to proceed to the next time slot. The order of checking if there is a specific type of non-packable message and the associated scheduling and transmission of the non-packable messages can be rearranged based on the requirements of the wireless telecommunication system. As explained above, other packable messages can be added to the non-packable block 274 in addition to or in place of the messages already in the non-packable block.

Figure 4E:
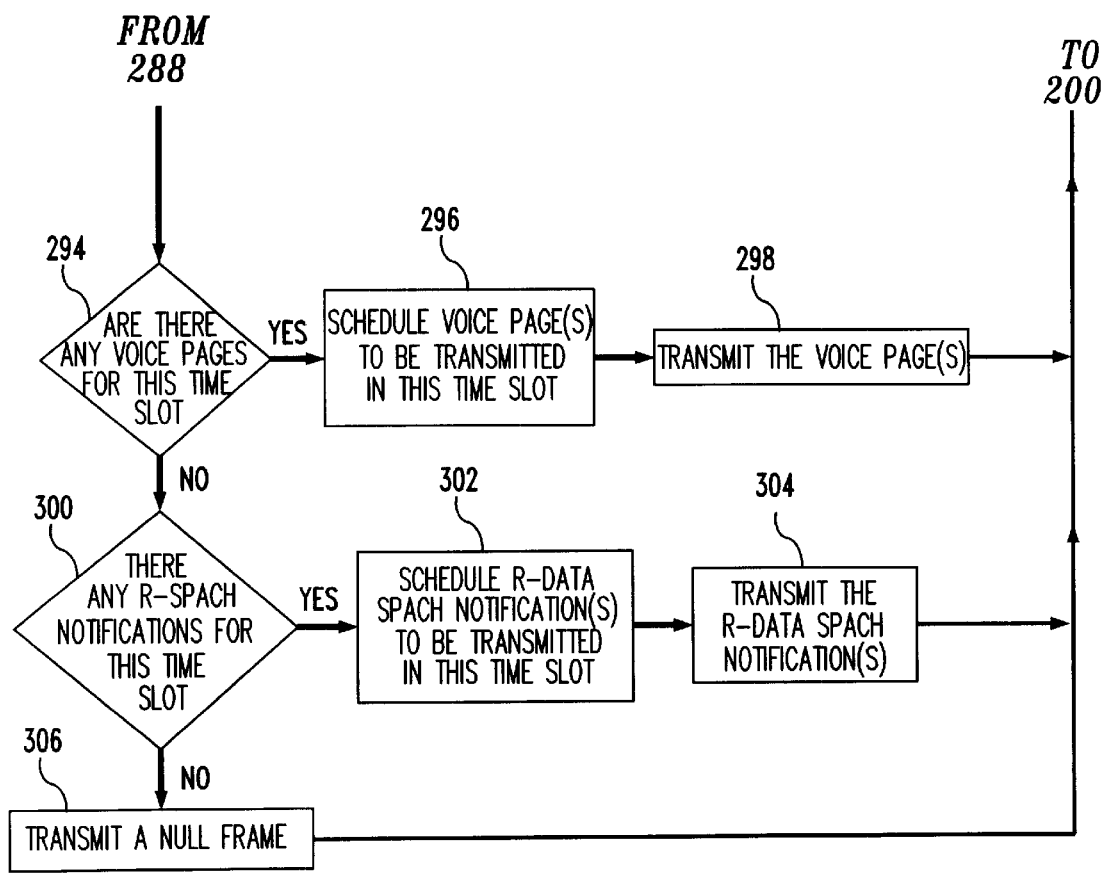

Referring to FIG. 4E, if there are no non-packable messages, step 294 determines whether there are any voice pages for this time slot. If there are, then at step 296 all of the voice pages for this time slot are scheduled to be transmitted, the voice pages are transmitted at step 298, and the method then returns to step 200 to proceed to the next time slot.

If there are no voice pages for this time slot, step 300 determines whether there are any R-DATA SPACH notifications for this time slot. If there are, then at step 302 all of the R-DATA SPACH notifications for this time slot are scheduled to be transmitted. At step 304 the R-DATA SPACH notifications are transmitted, and the method then returns to step 200 to proceed to the next time slot. The order of steps 294 and 300 that determined whether there are any voice pages and R-DATA SPACH notifications can be reversed. If there are no messages to be transmitted in this time slot, then at step 306 a null frame is transmitted and the method then returns to step 200 to proceed to the next time slot.

Referring again to FIG. 4A, returning to step 208, if this is not the primary but the secondary superframe of this hyperframe, then at step 310 it is determined if the message transmitted in the corresponding time slot of the corresponding primary superframe is a page. Since pages are repeated in corresponding time slots of both superframes of the hyperframe, if there was a page transmitted in the corresponding time slot of the primary superframe, then at step 312 the same page is scheduled to be transmitted for this time slot. At step 314 the pages are transmitted, and the method then returns to step 200 to proceed to the next time slot. If at step 310 the answer is no, then a non-page can be transmitted in this time slot, therefore the method proceeds to input A of the non-packable block 212.

Although this embodiment was described using voice pages and R-DATA notifications as the messages given highest priority, any packable messages can be given highest priority with the embodiment to obtain the advantages provided by this embodiment of the method.

Table 3 is a simulation showing the blocked messages and the timed out messages for a control channel based on voice page arrival rate given as a percentage of the control channel's voice page capacity in one system using the above described scheduling method where each control channel has 300 buffers. Comparing Table 3 to Table 1, the number of blocked calls and the number timed out messages for all of the message types except registration acknowledgments is significantly reduced. This allows more calls to go through and more messages to be sent over the system, particularly when the system is busy. Additionally, the total number of blocked and timed out messages is drastically reduced, thereby significantly improving the performance of the system.

TABLE 3

Priority Scheme Based on Packed Messages and Packable Message Queues

| Voice page load | 10% | 15% | 20% | 25% | 30% | 35% |
|---|---|---|---|---|---|---|
| Voice pages/hour | 16,031 | 24,047 | 32,063 | 40,078 | 48,094 | 56,109 |
| Queue-MAX | 18 | 21 | 26 | 31 | 38 | 51 |
| Blocked Messages/hour | 0 | 0 | 0 | 0 | 0 | 0 |
| Timed Out - voice pages/hour | 0 | 0 | 0 | 0 | 0 | 0 |
| Timed Out - channel assignments/hour | 0 | 0 | 0 | 0 | 0 | 0 |
| Timed Out - message waiting/hour | 0 | 0 | 0 | 0 | 0 | 0 |
| Timed Out - R-DATA SPACH notifications/hr | 0 | 0 | 0 | 0 | 0 | 2 |
| Timed Out - registration acknowledgements/hr. | 0 | 0 | 0 | 0 | 0 | 0 |
| Total (Timed Out + Blocked messages)/min | 0 | 0 | 0 | 0 | 0 | 0 |

| Voice page load | 40% | 45% | 50% | 55% | 60% |
|---|---|---|---|---|---|
| Voice pages/hour | 64,125 | 72,141 | 80,156 | 88,172 | 96,188 |
| Queue-MAX | 54 | 82 | 156 | 300 | 300 |
| Blocked Messages/hour | 0 | 0 | 0 | 1517 | 10443 |

TABLE 3-continued

| | | | | | |
|---|---|---|---|---|---|
| Timed Out - voice pages/hour | 0 | 0 | 0 | 0 | 0 |
| Timed Out - channel assignments/hour | 0 | 0 | 0 | 0 | 0 |
| Timed Out - message waiting/hour | 0 | 0 | 0 | 0 | 0 |
| Timed Out - R-DATA SPACH notifications/hr | 8 | 16 | 45 | 87 | 116 |
| Timed Out - registration acknowledgements/hr. | 0 | 0 | 233 | 6505 | 5867 |
| Total (Timed Out + Blocked messages)/min | 0 | 0 | 5 | 135 | 274 |

While the invention has been described with reference to a preferred embodiment, it will be understood by those skilled in the art having reference to the specification and drawings that various modifications may be made and various alternatives are possible therein without departing from the spirit and scope of the invention.

We claim:

1. A method for scheduling messages on a control channel of a wireless telecommunication system, the control channel having cyclically repeating sets of time slots, the method comprising the steps of:

selecting one of a plurality of priority schemes for scheduling messages for one of the time slots based on at least one of a plurality of characteristics of the state of the control channel; and scheduling messages for the time slot based on the selected priority scheme.

2. The method of claim 1, wherein the at least one characteristic of the state of the control channel comprises a set number of the time slot.

3. The method of claim 2, wherein:

the wireless system having a TDMA air interface;

the cyclically repeating set of time slots being a hyperframe; and the set number is the hyperframe number.

4. The method of claim 2, wherein the step of selecting one of the plurality of priority schemes for scheduling messages for the time slot based on the set number comprises:

selecting a first priority scheme that assigns a voice page highest priority when the set number is an even number; and selecting a second priority scheme that assigns an R-DATA SPACH notification highest priority when the set number is an odd number.

5. The method of claim 1, wherein the at least one characteristic of the state of the control channel comprises whether there are messages in any of a plurality of packable message queues for the time slot that have been in the packable message queues for the time slot since at least the end of the time slot construction period of a corresponding time slot of a previous set of cyclically repeating sets of time slots.

6. The method of claim 5, wherein the packable message queues include a voice page queue and a R-DATA SPACH message queue, and the step of selecting one of a plurality of priority schemes for scheduling messages for the one set of time slots comprises:

selecting a first priority scheme that assigns a voice page highest priority when there is a message in the voice page queue that has been in the voice page queue for the time slot since at least the end of the time slot construction period of the corresponding time slot of a previous set of cyclically repeating sets of time slots; and selecting a second priority scheme that assigns an R-DATA SPACH notification highest priority when there is a message in the R-DATA SPACH notification queue that has been in the R-DATA SPACH notification queue for the time slot since at least the end of the time slot construction period of the corresponding time slot of a previous set of the cyclically repeating sets of time slots.

7. The method of claim 1, wherein the at least one characteristic of the state of the control channel comprises the number of messages in one of a plurality of packable message queues for the time slot.

8. The method of claim 1, wherein the at least one characteristic of the state of the control channel comprises the length of time messages have been stored in one of a plurality of packable message queues for the time slot.

9. The method of claim 1, wherein the at least one characteristic of the state of the control channel comprises the type of message transmitted in a corresponding time slot of a previous set of the cyclically repeating sets of time slots.

10. The method of claim 9, wherein the step of selecting one of a plurality of priority schemes for scheduling messages for the one set of time slots based on the type of message transmitted in the corresponding time slot of the previous set of the cyclically repeating sets of time slots comprises:

selecting a first priority scheme that assigns a first message type highest priority when a second message type is transmitted in the corresponding time slot of the previous set of the cyclically repeating sets of time slots; and selecting a second priority scheme that assigns the second message type highest priority when a first message type is transmitted in the corresponding time slot of the previous set of the cyclically repeating sets of time slots.

11. The method of claim 9, wherein the step of selecting one of the plurality of priority schemes for scheduling messages for the one set of time slots based on the type of message transmitted in the corresponding time slot of the previous set of the cyclically repeating sets of time slots comprises:

selecting a first priority scheme that assigns a voice page highest priority when an R-DATA SPACH notification is transmitted in the corresponding time slot of the previous set of cyclically repeating sets of time slots; and selecting a second priority scheme that assigns the R-DATA SPACH notification highest priority when the voice page is transmitted in the corresponding time slot of the previous set of the cyclically repeating sets of time slots.

12. The method of claim 1, wherein the at least one characteristic of the state of the control channel comprises the entire state of the wireless system.

13. The method of claim 1, wherein:

the wireless system having a TDMA air interface; and the cyclically repeating set of time slots being a hyperframe.

14. The method of claim 1, wherein:

each cyclically repeating set of time slots includes at least one time slot reserved for broadcast messages and at least one time slot reserved for control messages.

15. A method for scheduling messages on a control channel of a wireless telecommunication system, wherein the control channel comprises cyclically repeating time slots, the method comprising the steps of:

scheduling a packed airlink message in a time slot of a cyclically repeating set of time slots when there are at least enough of one type of packable messages for the time slot to generate a packed airlink message;

responsive to there being less than the number of any one type of packable messages needed to generate a packed airlink message, and the number of packable messages in any packable message queues since at least the end of the time slot construction period of a corresponding time slot of a previous cyclically repeating set of time slots being zero:

scheduling a non-packable message in the time slot responsive to there being at least one non-packable message;

scheduling an unpacked airlink message in the time slot responsive to there being no non-packable message and there being at least one unpacked airlink message for the time slot;

responsive to there being less than the number of any one type of packable messages needed to generate a packed airlink message, and there being the packable message in any packable message queues since at least the end of the time slot construction period of the corresponding time slot of the previous set of cyclically repeating time slots:

scheduling at least one unpacked airlink message in the time slot.

16. The method of claim 15, the step of scheduling the packed airlink message in the time slot of the cyclically repeating set of time slots comprises:

responsive to the number of packable messages in any packable message queues since at least the end of the time slot construction period of a corresponding time slot of a previous cyclically repeating set of time slots being zero:

scheduling a packed airlink message of a first type in the time slot when there are at least enough of first type packable messages for the time slot to generate the packed airlink message of the first type; and scheduling a packed airlink message of a second type in the time slot when there are at least enough of second type packable messages for the time slot to generate the packed airlink message of the second type responsive to there being zero packed airlink messages of the first type; and responsive to there being the packable message in any packable message queues since at least the end of the time slot construction period of the corresponding time slot of a previous cyclically repeating set of time slots:

scheduling a packed airlink message of a second type in the time slot when there are at least enough of second type packable messages for the time slot to generate the packed airlink message of the second type; and scheduling a packed airlink message of a first type in the time slot when there are at least enough of first type packable messages for the time slot to generate the packed airlink message of the first type responsive to there being zero packed airlink messages of the second type.

17. The method of claim 16, wherein:

the fist type packable message being a voice page message;

the second type packable message being an R-DATA SPACH notification.

18. The method of claim 16, wherein:

the packed airlink messages of the first type comprising of three voice pages;

the packed airlink messages of the second type comprising of two R-DATA SPACH notifications.

19. The method of claim 15, wherein:

the wireless system having a TDMA air interface; and the cyclically repeating set of time slots being a hyperframe.

20. The method of claim 15, wherein:

each cyclically repeating set of time slots includes at least one time slot reserved for broadcast messages and at least one time slot reserved for non-pages.

* * * * *